(12) United States Patent
Lasseel et al.

(10) Patent No.: US 11,614,347 B2
(45) Date of Patent: Mar. 28, 2023

(54) DEVICE AND METHOD FOR STORING INFORMATION RELATING TO THE OPERATION OF A ROLL OR WHEEL AND THE OBTAINED ROLL OR THE OBTAINED WHEEL

(71) Applicant: Hannecard NV, Ronse (BE)

(72) Inventors: Sammy Lasseel, Smetlede (BE); Dirk Vidts, Ronse (BE)

(73) Assignee: HANNECARD NV, Ronse (BE)

( * ) Notice: Subject to any disclaimer, the term of this patent is extended or adjusted under 35 U.S.C. 154(b) by 9 days.

(21) Appl. No.: 16/098,930

(22) PCT Filed: May 4, 2017

(86) PCT No.: PCT/IB2017/052602
§ 371 (c)(1),
(2) Date: Nov. 5, 2018

(87) PCT Pub. No.: WO2017/191592
PCT Pub. Date: Nov. 9, 2017

(65) Prior Publication Data
US 2019/0094050 A1 Mar. 28, 2019

(30) Foreign Application Priority Data

May 4, 2016 (BE) .................................. 2016/5321

(51) Int. Cl.
*G01D 9/00* (2006.01)
*H04W 4/38* (2018.01)
(Continued)

(52) U.S. Cl.
CPC ........... *G01D 9/005* (2013.01); *H04B 5/0037* (2013.01); *H04L 69/18* (2013.01);
(Continued)

(58) Field of Classification Search
CPC ...................................................... G01D 9/005
See application file for complete search history.

(56) References Cited

U.S. PATENT DOCUMENTS

2002/0092346 A1    7/2002  Niekerk
2004/0075022 A1*   4/2004  MacKness ......... B64D 45/0005
                                              244/100 R
(Continued)

FOREIGN PATENT DOCUMENTS

AU    WO2015042661   *  4/2015
CN       2836151 Y     11/2006
(Continued)

*Primary Examiner* — Clayton E. LaBalle
*Assistant Examiner* — Diana Hancock
(74) *Attorney, Agent, or Firm* — Cermak Nakajima & McGowan LLP; James Creighton Wray (57) ABSTRACT

The present invention relates to a roll or a wheel, wherein the roll or the wheel is provided with (i) a stiff, essentially cylindrical roll core or wheel core that is provided at its lateral surface with a surface that is subject to wear; (ii) a data logger, that is positioned on said roll core or said wheel core of said surface, provided with at least (a) a sensor for monitoring information relating to the operation of said roll or said wheel or said surface; (b) a processor for processing said information; (c) tangible, non-volatile memory for storing said information; (d) a wireless network interface for sending and receiving data comprising said information; (e) program data stored in said memory for controlling said processor; (g) a battery or equivalent energy source for feeding (a) and/or (b) and/or (c) and/or (d); wherein said data comprise roll or wheel related data, such as e.g. a unique serial number and/or dimensions for identification of the roll or the wheel.

20 Claims, 2 Drawing Sheets

(51) Int. Cl.
*H04B 5/00* (2006.01)
*H04L 69/18* (2022.01)
*H04N 1/00* (2006.01)
*H04W 4/80* (2018.01)

(52) U.S. Cl.
CPC ..... *H04N 1/00323* (2013.01); *H04N 1/00408* (2013.01); *H04W 4/38* (2018.02); *H04W 4/80* (2018.02)

(56) References Cited

U.S. PATENT DOCUMENTS

| | | | | |
|---|---|---|---|---|
| 2004/0187568 | A1* | 9/2004 | Locatelli | B60C 23/0428 73/146.3 |
| 2010/0033007 | A1* | 2/2010 | Fisher | B60B 7/0026 301/108.1 |
| 2012/0065937 | A1* | 3/2012 | de Graff | G01D 9/005 702/187 |
| 2014/0043154 | A1* | 2/2014 | Lundqvist | B60C 29/064 340/447 |
| 2014/0219746 | A1* | 8/2014 | Dooner | F16B 37/14 411/429 |
| 2014/0331759 | A1* | 11/2014 | Chen | G01L 17/00 73/146.5 |
| 2015/0375577 | A1* | 12/2015 | Serbu | B60C 23/0408 152/419 |
| 2017/0023442 | A1* | 1/2017 | Braghiroli | H04W 4/70 |
| 2017/0210409 | A1* | 7/2017 | Streifinger | B62D 1/046 |
| 2017/0370803 | A1* | 12/2017 | Moutsouriz | B65G 39/00 |

FOREIGN PATENT DOCUMENTS

| | | |
|---|---|---|
| DE | 10040356 A1 | 2/2002 |
| DE | 69809751 T2 | 7/2003 |
| EP | 0671289 A1 | 9/1995 |
| EP | 0925959 A2 | 6/1999 |
| EP | 1653207 A2 | 5/2006 |
| EP | 1958796 A2 | 8/2008 |
| EP | 2392728 A1 | 12/2011 |
| WO | 9522467 A1 | 8/1995 |
| WO | 9905486 A2 | 2/1999 |
| WO | 2004016454 A1 | 2/2004 |
| WO | WO2015/042661 A2 | 4/2015 |

* cited by examiner

DEVICE AND METHOD FOR STORING INFORMATION RELATING TO THE OPERATION OF A ROLL OR WHEEL AND THE OBTAINED ROLL OR THE OBTAINED WHEEL

This application claims the benefit of Belgian Application No. BE 2016/5321 filed May 4, 2016 and PCT/IB2017/052602 filed May 4, 2017, International Publication No. WO 2017/191592, which are hereby incorporated by reference in their entirety as if fully set forth herein.

TECHNICAL DOMAIN

The present invention relates to rolls, wheels and rollers for treating, processing and/or transporting goods.

BACKGROUND

Rolls, wheels and rollers are used in very demanding industrial environments where they are subject to long-term use and high loads and tensions. They have different applications in treating, processing and transporting goods. Typically, a roll or wheel is part of a bigger industrial device, that comprises in many cases a plurality of rolls and/or wheels that are tuned to each other.

A typical design of a roll starts from a hollow or filled metal roll core. On the lateral surface of this roll core, a roll surface is applied or not. On the one hand, this roll surface can consist of a fouling on the roll core, e.g. through deposition of polymers on the surface of the roll, followed by "curing" in an oven. On the other hand, this roll surface can be applied to the roll core as a prefabricated roll sleeve, e.g. by providing a high air pressure at the lateral surface of the roll core and by sliding a roll sleeve that has expanded under the effect of this air pressure over the roll core. Also for the construction of a wheel, one typically starts for a metal wheel core. On the lateral surface of this wheel core, a wheel surface is applied or not. Just like with a roll, the wheel surface can on the one hand be a fouling on the wheel core, or on the other hand a prefabricated wheel sleeve, e.g. a rubber sleeve or band.

When choosing the roll surface or wheel surface, one opts for a material and surface treatment that is appropriate for the particular application. E.g. for coating flat or bowed metal surfaces with paint or varnish, one typically uses a robust roll, and one often works with a separately produced roll sleeve. Also for other applications such as the transport of goods, a combination of a metal roll core or wheel core with an adapted roll surface is often used, wherein the roll surface or wheel surface is applied to the roll core or wheel core either as fouling or as a separately produced element.

For each of said applications, the roll or wheel surface is, in case of long-term use, subject to abrasion, corrosion, adhesive wear, surface fatigue, erosion, fretting, chemical attack, temperature fluctuations and other wear-related factors. The roll or the wheel must therefore regularly be inspected in order to remain operative, and must be replaced in time, if necessary. In case of a roll, the following considerations apply, that are similar in case of a wheel.

If the roll surface is a separately produced roll sleeve, it can easily be slit from the roll core and be replaced by a new roll sleeve. In this case, not the whole roll must thus be repaired or replaced, but only the roll sleeve.

If the roll surface is a fouling on the roll core, it must be removed from the roll core, either mechanically or chemically, after which the roll core is sand-blasted or not, after which a new roll surface can be applied to the roll core. Also in this case, not the whole roll must thus be repaired or replaced, but only the roll surface.

An important problem when keeping operative and timely changing rolls or wheels is the determination of the correct history of the working conditions and operation of the roll or the wheel. An exposure to certain environmental factors such as abrasion or corrosion, high rotation speeds, high external pressure and/or high temperature can lead to faster wear. In this way, even limited rotation speeds can lead to substantial circumferential speeds at the roll or wheel surface, in particular for rolls or wheels with a large diameter, sometimes leading to faster wear of the surface as the circumferential speed increases. In some cases, it is possible to observe these factors by simple visual inspection of the roll or wheel surface. In other cases, these factors can be observed based on the product that is in contact with the roll or the wheel. This is for example the case when, in the production of a product, one determines that the product shows defects, which can indicate that the roll or the wheel with which the product is processed, does no longer properly fulfill its defined functions. But even in the best case, such a diagnosis will only give an incomplete image of the wear process to which the roll or the wheel has been subjected. A more complete image of the operation of a roll or wheel is possible by specifically monitoring the factors that can have an effect, and storing this information. An adequate way of monitoring is by means of a sensor that is positioned on the roll or the wheel.

DE 100 40 356 describes a device for contactless detection of sensor data with a data logger. The sensor data relate to moving parts. A problem with the device according to DE 100 40 356 is that it doesn't describe a roll or wheel. A fortiori, DE 100 40 356 does in no way refer to a roll or wheel provided with a roll core or wheel core that at its lateral surface, is provided with a surface that is subject to wear. On the contrary, DE 100 40 356 describes machine parts for which the characteristics of the surface are little or not relevant to its operation, such as driving rods and camshafts. Another problem with DE 100 40 356 is that the device does not store any data relating to the machine parts in itself, but only relating to the movement of these machine parts. Another problem is that the device according to DE 100 40 356 is complex in use because of the requirement for a minimum rotation speed. Further problems with the device according to DE 100 40 356 are discussed later in the present document.

DE 698 09 751 and, related, WO 1999/005486A2, describe a method and device which allow to monitor the vibrations of a machine. Therefore, the device is mechanically coupled to a measurement point on the machine. It can be the housing of a single bearing. In a preferred embodiment, the device is capable of storing an identification code, as well as the rotation speed and a part number of the bearing. A problem with the device according to DE 698 09 751 is that it does not describe a roll or wheel, and thus certainly not a roll or wheel provided with a roll core or wheel core that at its lateral surface, is provided with a surface that is subject to wear. Another problem is that a device according to DE 698 09 751, if it is mounted in the vicinity of a rotating part, is not mounted on the actual part, but on the housing of the bearing that is connected to this part. As a result, there is no guarantee as to the association of the device with the rotating part. Further problems with the device according to DE 698 09 751 are discussed later in the present document.

In EP 1 653 207, a concept is discussed with wireless sensors that are integrated in a roll sleeve that is applied to a roll core. Several sensors are spread over the roll sleeve, and dispose each separately of a wireless sending unit, that wirelessly sends the measured information to a receiver that is located in the vicinity of the roll, and that guarantees further processing of this information. The collected information relates to the temperature, pressure, maximum pressure, tension, nip width and humidity. An important disadvantage of said device on the roll is the lack of autonomy. It is indeed supposed that there is a receiver in the neighborhood to take over the measured information from the sensors. If the receiver is for long periods (e.g. several days or weeks) not in the vicinity of the roll, part of the measured information irrevocably gets lost. A second important disadvantage of the concept suggested in EP 1 653 207 is the high complexity, which can lead to an interrupted operation of the roll. It is indeed suggested that the sensors are integrated in the roll sleeve, which is detrimental when the application requires a high degree of homogeneity for the roll surface. In such case, the presence of sensors can seriously locally disturb the characteristics, and even lead to a disturbed surface profile. A third disadvantage of said concept is that it is not specifically adapted for measuring rotation speeds. A fourth disadvantage is the lack of information security; as the information sent by the send units, is not encrypted, each receiver located in the vicinity can read the information, also if this receiver is not authorized to do this. A fifth disadvantage is that these sensors cannot be applied under very thin surfaces such as for example those made of tungsten carbide that have typical thickness between 100 and 300 μm, or these made of hard chrome layers, with even lower thicknesses. A sixth disadvantage is that rolls or wheels, e.g. those made of steel and without any coating, also cannot be mounted because the sensors disturb the roll surface.

In EP 2 392 728, a concept is described with a plurality of sensors belonging to more than one different collection. Each collection of sensors is mutually connected and is moreover connected to a multiplexer module that is also present at an end of the roll. This multiplexer receives and collects data from the sensors such as pressure measurements and sends them to a receiver that is in the vicinity of the roll. For this, the same rules apply as these mentioned for EP 1 653 207. Firstly, the concept has a lack of autonomy, which can lead to loss of information. Secondly, the proposition is much too complex, which can lead to a disturbed operation, as the integration of, sensors in the roll sleeve can have a negative effect on the characteristics of the roll. Thirdly, the concept is not specifically adapted to measure rotation speeds. Fourthly, the information sent by the multiplexer is not encrypted, as a result of which also non-authorized receivers can read the information. Fifthly, the physical application of these sensors for particular embodiments is extremely complex and industrially difficult to repeat. This is particularly the case for e.g. applying sensors in polymers that are set afterwards at high temperatures.

There is a need for an improved device and an improved method for monitoring the operation and storage of information with respect to working conditions of rolls, roll cores and roll surfaces, as well as wheels, wheel cores and wheel surfaces. There is also a need for a roll and wheel that is adapted for allowing this monitoring and storage. The present invention relates to an improved roll, roll core and improved roll surface as well as an improved wheel, an improved wheel core and an improved wheel surface for storing information about the operation of the roll or the wheel, with a device and a method offering a solution for at least one of said disadvantages of known rolls and wheels.

SUMMARY OF THE INVENTION

In a first aspect, the invention relates to a roll or a wheel, wherein the roll or the wheel is provided with
 (i) a stiff, substantially cylindrical roll core or wheel wore that is provided at its lateral surface with a surface that is subject to wear;
 (ii) a data logger applied to said roll core or said wheel core or said surface provided with
  (a) a sensor for monitoring information with respect to the operation of said roll or said wheel or said surface,
  (b) a processor for processing said information,
  (c) tangible non-volatile memory for storing said information,
  (d) a wireless network interface for sending and receiving data comprising said information,
  (e) program data storing in said memory for driving said processor,
  (f) preferably, an indicator for displaying a part of said data, such as e.g. a LED indicator or an audio source and
  (g) a battery or equivalent energy source for feeding (a) and/or (b) and/or (c) and/or (d) and/or (f),
 wherein said data comprises roll and wheel related data, such as e.g. a unique serial number and/or dimensions for the identification of the roll or the wheel.

In a preferred embodiment, the roll or the wheel is an industrial roll or an industrial wheel for use in an industrial installation.

In a preferred embodiment, this information relating to the operation of said or said wheel or said surface relates to a plurality of quantities with relevance for the wear of the roll or the wheel. An extra example of such a quantity is the rotation speed of the roll or the wheel. Such another quantity is the number of revolutions, which can for example be monitored by configuring the data logger in such way that each rotation of the roll or the wheel results in a pulse at the output of the data logger.

The advantage of such a device is that with one single data logger, it can realize a double function. On the one hand, the data logger provides for the monitoring of information relating to the operation of the roll or the wheel, wherein the information is preferably relevant to the wear of the surface that is subject to wear. On the other hand, the data logger provides for the storage of the roll and wheel related data, as a result of which the roll or the wheel can be categorized, identified and/or tracked, also if this roll or this wheel is not mounted in a machine, but e.g. is located in a warehouse and/or is ready for sale or transport.

Such an advantage is not offered by a data logger according to DE 100 40 356. As DE 100 40 356 completely relates to the monitoring of the movement of a moving part, there are no provisions for the categorization, identification and/or tracking of this part. A data logger, according to DE 100 40 356 namely doesn't provide for the storage of data that relate to the moving part. Moreover, such data would, even if they are stored in the data logger, not be available when the part is not mounted, because the data logger according to DE 100 40 356 is limited by the requirement of a minimum speed. As a result, a data logger according to DE 100 40 356 cannot be used for storing part related data when the part is located in a warehouse and/or is ready for sale or transport. Moreover, DE 100 40 356 does not have any direct relevance for the present invention, as it relates to machine parts for which the characteristics of the surface have little or no relevance for their operation, such as driving rods and camshafts, and not to parts with a lateral surface that is subject to wear, such as a roll or wheel according to the present invention.

Such an advantage is also not offered by a data logger according to DE 698 09 751. This data logger is namely adapted for monitoring vibrations and characteristics of vibrations, but not for keeping data with respect to a specific machine part. The device is namely not adapted for being monitored on a roll or wheel, but is on the contrary adapted either for being mounted on non-rotating portions of the machine, or, in case of measurements close to a rotating axis, for being mounted on the casing of the bearing, that can be distinguished from the actual rotating part. The device according to DE 698 09 751 is thus not placed directly on the actual rotating part, as a result of which there can be no permanent association with a specific machine part. And further, DE 698 09 751 also does not describe or suggest the tracking of machine parts by means of the device, as DE 698 09 751 completely relates to the detailed measurement of vibrations and characteristics of these vibration, and not to the identification of machine parts. Furthermore, DE 698 09 751 has no direct relevance for the present invention, as it does not describe a roll or wheel, and thus certainly not a roll or wheel provided with a roll core or wheel core that at its lateral surface, is provided with a surface that is subject to wear. A device according to DE 698 09 751 does have, in a preferred embodiment, provisions for measuring rotation speed, but not for keeping track of a number of revolutions.

In a preferred embodiment of the present invention, said battery or equivalent energy source allows a life time of at least one year. This offers important advantages at the actual use of the roll or the wheel, but also at the storage. Such an embodiment namely allows the storage of the roll or the wheel on the long term, e.g. when the roll or the wheel is ready for sale or transport, while the stock still easily remains identifiable electronically, thanks to the presence of the data logger. Such advantages are not offered by DE 698 09 751 or DE 100 40 356.

In a further aspect, the invention relates to a means of transport comprising a wheel according to the present in invention. The advantages of the invention are similar to those mentioned for a roll or wheel.

According to another aspect, the invention provides for a use of a roll or wheel according to the present invention in an industrial installation.

Another aspect of the present invention relates to the use of a wheel according to the present invention in a means of transport.

Further preferred embodiments will be discussed in the detailed description and the claims

DETAILED DESCRIPTION

Figure 1:
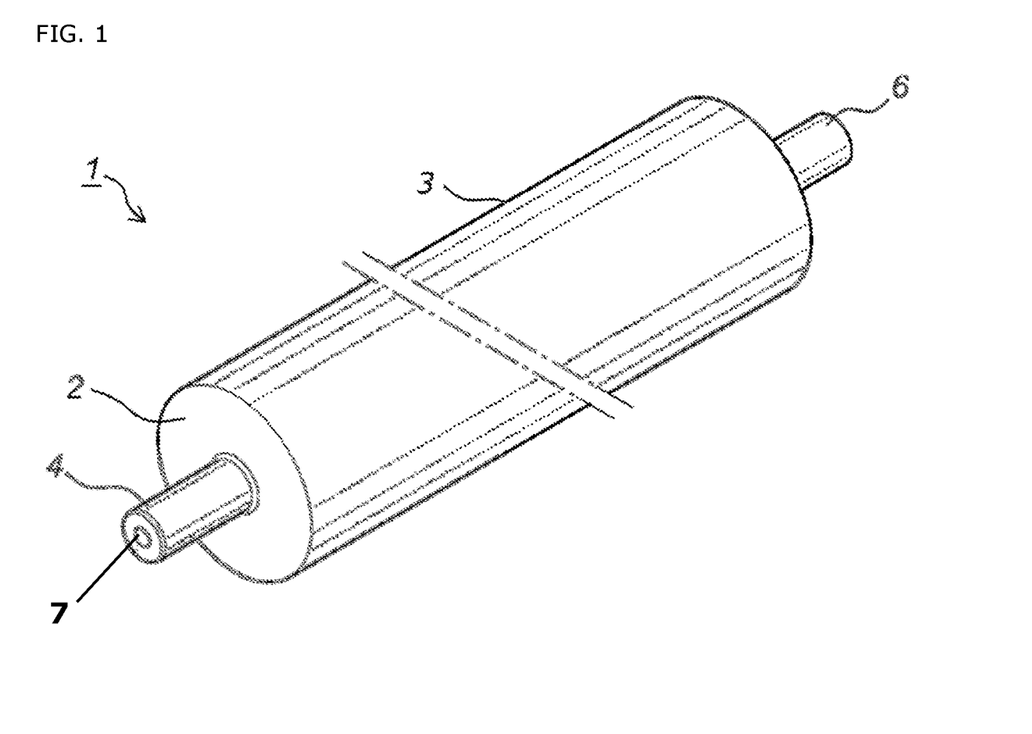
FIG. 1 shows an industrial roll or wheel.

In FIG. 1 a roll or wheel 1 has a stiff substantially cylindrical core 2 that is provided at its lateral surface with a surface 3 that is subject to wear. The roll or wheel has an axle 4, 6. A data logger 7 is applied to the core or the surface.

Figure 2:
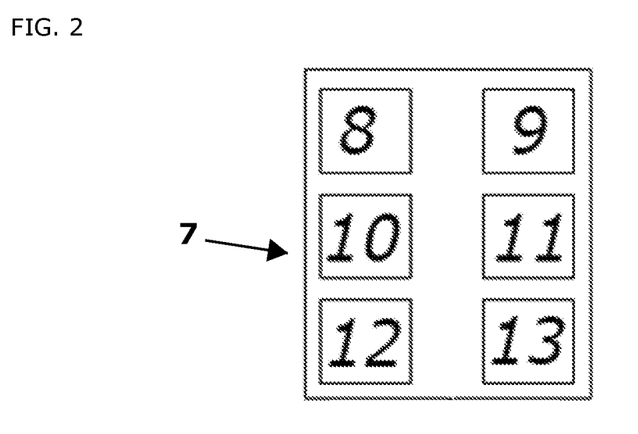
FIG. 2 shows a data logger.

As shown in FIG. 2, the data logger 7 has a sensor 8, a processor 9, a non-volatile memory 10, a wireless network interface 11, an indicator 12 and a battery 13.

Figure 3:
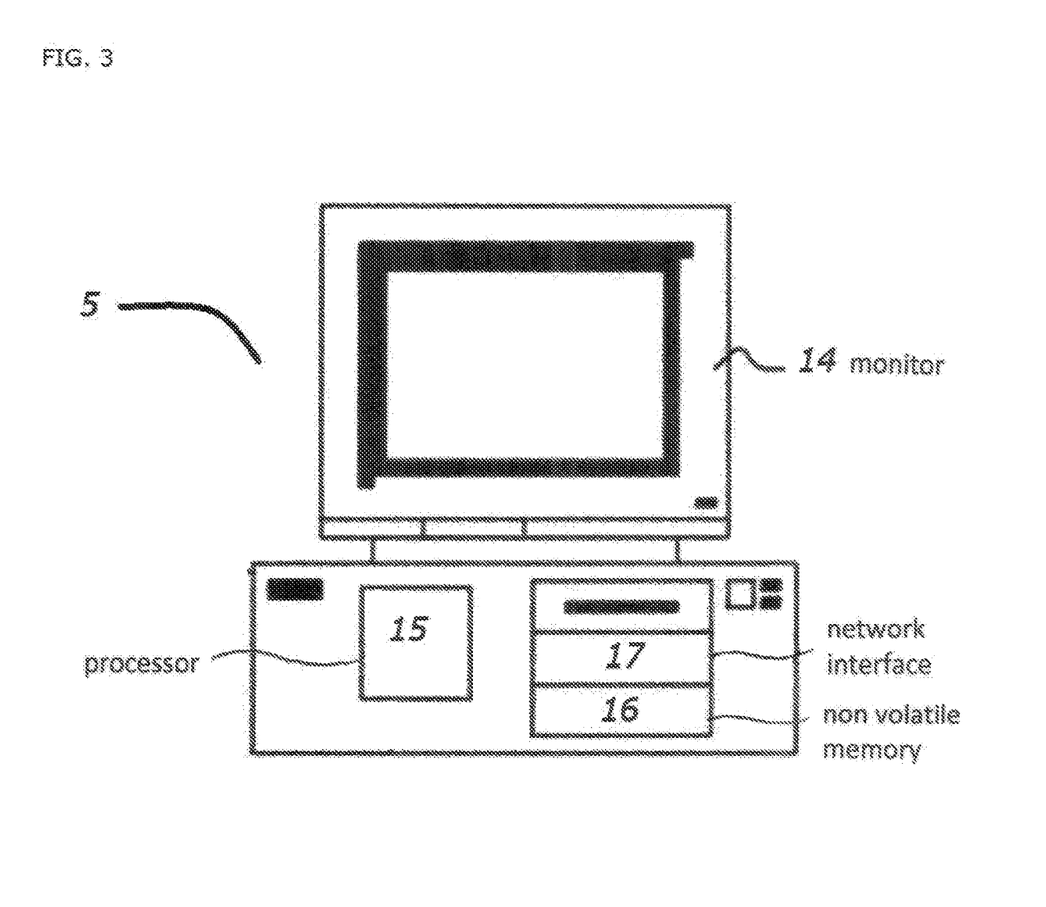
FIG. 3 shows a display.

FIG. 3 shows a display device 5 with device processor 15 for information from a non-volatile memory device 16, a wireless network interface 17, a monitor 14 and printer device for displaying and printing information.

DETAILED DESCRIPTION

"A", "an" and "the" refer in this document to both the singular and the plural unless otherwise specified by the context. For example, "a pocket" means one or more than one pocket.

The term "include", "including", "consist of", "consisting of", "provide with", "comprise", "comprising", "involve", "involving", are synonyms and are inclusive of open terms that indicate the presence of what follows, and that do not exclude or prevent the presence of other components, characteristics, elements, members, steps, known from or described in the state of the art.

The citation of numeric intervals by means of endpoints comprises all integers, fractions and/or real numbers between the endpoints, including these endpoints.

Unless otherwise specified, all terms used in the description of the invention, including technical and scientific terms, shall have the meaning as they are generally understood by the worker in the technical field of the invention.

In the following, the invention will be described by means of non-limiting examples illustrating the invention. These examples are not meant or cannot be interpreted as limiting the scope of the invention.

In the present invention, the term "roll" also means "roller". The terms "encoding" and "encryption" are used interchangeably in the context of the present invention. The terms "encode" and "encrypt" are also used interchangeably in the context of the present invention. The term "roll" and "wheel" are often mentioned together, as they are, unless stated otherwise, mutually interchangeable and, interchangeable with the umbrella term "roll element".

The term "information" comprises in the present invention all possible measurements with respect to the roll or the wheel and the operation of the roll or the wheel, as well as calculated values resulting from arithmetical operations on the measurements. It should be distinguished from the term "data" that comprises, next to said information, also all types of instructions, such as e.g. the instructions exchanged between the data logger and e.g. the display device, as well as other possible forms of data.

DE 100 40 356 describes a device for contactless detection of sensor data with a data logger. The sensor data relate to moving parts. A problem with the device according to DE 100 40 356 is that it doesn't describe a roll or wheel. A fortiori, DE 100 40 356 does in no way refer to a roll or, wheel provided with a roll core or wheel core that at its lateral surface, is provided with a surface that is subject to wear. On the contrary, DE 100 40 356 describes machine parts for which the characteristics of the surface are little or not relevant to its operation, such as driving rods and camshafts. Another problem is that DE 100 40 356 does not provide for the tracking of the individual parts of which the movement is monitored. More in particular, a device according to DE 100 40 356 allows for the monitoring of the movement of an individual part, but does not allow for the unique identification of the individual part. Also, it is not possible to keep statistical information relating to the individual part, such as the part number of the dimensions of the part. Another problem with DE 100 40 356 is that the data logger does not allow for automatic storing on the long term. DE 100 40 356 is namely directed to a data logger with real-time data transfer of measured data, wherein data are preferably transferred to an extern receiver at each revolution. Hereby, the real-time character is a crucial aspect, and there is no provision for storing the data on the long term without making a connection with the external receiver. Finally, the operation of the data logger according to DE 100 40 356 is limited by the requirement of a minimum speed, making the use of the data logger unnecessarily complex.

DE 698 09 751 and, related, WO 1999/005486A2, describe a method and device which allow to monitor the vibrations of a machine. Therefore, the device is mechanically coupled to a measurement point on the machine. It can be the housing of a single bearing. In a preferred embodiment, the device is capable of storing an identification code, as well as the rotation speed and a part number of the bearing. A problem with the device according to DE 698 09 751 is that it does not describe a roll or wheel, and thus certainly not a roll or wheel provided with a roll core or wheel core that at its lateral surface, is provided with a surface that is subject to wear. On the contrary, a device according to DE 698 09 751 is adapted for either being mounted on non-rotating portions of the machine, or, in the case of measurement close to a rotating axis, for being mounted on the casing of the bearing, that can be distinguished from the actual rotating part. In no case, the device is thus directly placed on the actual rotating part. As a result, no permanent mechanical coupling can be made between the device and the actual rotating part. Another problem is that there is no way to identify rotating parts. It is true that there is a part number provided for the bearing, but it is provided for determining the type of part, and not for identifying the part in a unique way. And although it is possible to assign an identification code to the device and/or the mounting location on the machine, it doesn't offer an identification of the actual rotating part, as there is no direct connection of the device to the actual rotating part. During its life time, the device can thus be coupled to several rotating parts, as a result of which a reliable identification of the actual rotating part is not possible. And further, DE 698 09 751 also does not describe or suggest the tracking of machine parts by means of the device, as DE 698 09 751 completely relates to the detailed measurement of vibrations and characteristics of these vibrations, and not to the identification of machine parts. Finally, a device according to 698 09 751 does, in a preferred embodiment, have provisions for measuring the rotation speed, but not for keeping a number of revolutions. Nevertheless, the latter is an important parameter when estimating the wear of the monitored part.

The present invention offers a solution for the problem of monitoring the operation and storing information with respect to the operation of rolls, roll cores, roll sleeves and other roll surfaces, as well as of wheels, wheel cores and wheel surfaces. Contrary to the solutions that are known from the state of the art, this solution is autonomous, because no receiver must be in the vicinity of the roll or wheel in order to monitor information. Secondly, this solution is easier, as it does not suppose the positioning of sensors on or in the roll or wheel surface. In this way, certain problems are avoided. For example, it is possible that the application of the roll or the wheel requires a high degree of homogeneity. In such case, the presence of sensors can seriously locally disturb the characteristics, and even lead to a disturbed surface profile. Such problems are absent in the case of the suggested solution, because the solution does not interfere with the roll or wheel surface. Thirdly, the suggested solution according to a possible embodiment is specifically adapted for measuring rotation speeds. Fourthly, the suggested solution according to a possible embodiment is provided with information security, wherein the information sent by the send unit is encrypted. As a result, a receiver that is located in the vicinity, can only read the information if the receiver is effectively authorized to do so. Because no sensors must be integrated in the roll surface (that is set in ovens or autoclaves according to a typical embodiment) or wheel surface, cheaper components can also be used. Because it is not necessary that sensors are present under the surface, rolls with thinner surface layers such as tungsten carbides (typical thickness 100 to 300µ) can also be considered, as well as rolls that resist to high surface temperatures, such as e.g. rolls in warm rollers streets.

In a preferred embodiment, the invention relates to a roll or wheel, and more preferably to an industrial roll or an industrial wheel, for use in an industrial installation, wherein the roll or the wheel is provided with a roll core or wheel core and a data logger, wherein said data comprise roll or wheel related data, such as e.g. a unique serial number and/or dimensions for identification of the roll or the wheel, and wherein the roll or the wheel more preferably is adapted to function without a drive. In a preferred embodiment of the present invention, the roll or the wheel is moreover adapted to function with a drive, wherein the drive consists of a torque transferred to a driving source at the roll or the wheel via the rotation axis of the roll or the wheel. The roll core is a stiff cylindrical hollow or filled roll core that is provided at its lateral surface with a roll surface that is subject to wear. This roll surface can be a separately produced roll sleeve, but it can also be a fouling onto the roll core. In an embodiment, the roll core comprises at its ends bearing-axis-taps or internal roll elements. Similarly, the wheel core is a stiff, more or less cylindrical hollow or filled core that is provided at its lateral surface with a wheel surface that is subject to wear, that can be produced separately, but that can also be a fouling onto the wheel core. In an embodiment, the wheel core comprises at its ends bearing-axis-taps or internal roll elements. In a preferred embodiment, the roll or the wheel is adapted to be removed from the industrial installation in a simple way, as well as to be mounted into the industrial installation in an easy way. The data logger is installed onto the roll or the wheel, either through connection to said roll or wheel core, or through connection onto the roll or wheel surface. In an embodiment, the roll or the wheel is provided with an axis at its end, wherein the data logger is installed on said axis, either at the end or at the lateral surface of said axis. The data logger is provided with several components such as a sensor, a processor, a memory unit, a wireless network interface, a battery or equivalent energy source, and preferably also an indicator. Moreover, the data logger comprises program data. The sensor is adapted for monitoring information related to the operation of said roll or said wheel. The sensor can comprise one single measurement instrument, but it can also comprise several measurement instruments, that collectively allow to monitor different forms of information. Forms of information that can be monitored, are e.g. temperature, pressure, gear, vicinity, movement, infrared signals and/or infrared radiation and geographical positioning. The processor processes said information. The memory is tangible and non-volatile, and is adapted for storing said information. The wireless network interface is appropriate for measuring and receiving measured data according to a wireless connection or not. The battery or equivalent energy source is adapted for feeding one of above-said components, as well as possibly for operating different visual or non-visual indicators or detectors, if provided. An equivalent energy source that could function as a battery, is for example an "energy harvesting" source of electric energy that takes this energy from the radiation energy, thermal energy, mechanic energy, magnetic energy or biochemical energy that is present in the environment. The indicator is adapted for displaying a part of the information. In a preferred embodiment, the indicator lights up as a warning or information signal, e.g. in the case of a LED indicator that lights up when the data logger determines that a particular measured value, e.g. rotation speed, exceeds a particular threshold value. In another embodiment, the LED indicator can be changed by an audio source that can e.g. send an alarm signal when the data logger measures certain values. The fact that the roll or the wheel can be adapted to function without any drive is an important advantage of the present invention. In case the roll or the wheel is adapted to be driven externally, one can indeed suppose that a part of the information concerning the operation of the roll or the wheel is known to the driving source ensuring the external drive, and could thus principally be measured at this driving source. Herby, the driving source thus has potential for an extra instrument for monitoring a part of said information. In case the roll or wheel is adapted to function without any external drive, however, no such driving source is present, and thus there is also no extra instrument for monitoring a part of said information, as a result of which, more than in the case a driving source would be present, one has to use said data logger for monitoring according to the present invention. Also, even in case of a driven roll, the data logger can measure more precise values or another kind of values.

In a further aspect, the invention relates to a roll or wheel, more preferably an industrial roll or an industrial wheel, as described above, wherein said data logger is at least partially in a countersunk way applied to said roll core or said wheel core or said surface. In an embodiment, the data logger is completely countersunk, wherein said data logger is positioned either in a recess on the surface or completely under the surface. In an embodiment wherein the roll or the wheel is provided at an end with an axle, the data logger according to a further embodiment is at least partially in a countersunk way applied to said axle. In a further embodiment, the data logger is completely countersunk in the axle, wherein said data logger is positioned either in a recess on the surface of the axle or completely under the surface of the axle.

In a further aspect, the invention relates to a roll or wheel, preferably an industrial roll or an industrial wheel, as described above, wherein said sensor comprises one or more of the following measurement instruments: an accelerometer, a pressure sensor, a temperature sensor, a movement sensor, an infrared sensor or a positioning sensor. The accelerometer, if present, allows to measure the rotation speed of the roll or the wheel; if an accelerometer is present, said information thus also comprises this rotation speed. In a similar way, the pressure sensor, if present, allows to measure the pressure of the roll or the wheel; if a pressure sensor is present, said information comprises this pressure. Also in a similar way, the temperature sensor, if present, allows to measure the temperature of the roll or the wheel; if a temperature sensor is present, said information comprises this temperature. Also, the movement sensor, if present, allows to measure the movement of the roll or the wheel; if a movement sensor is present, said information comprises this movement. Also, the infrared sensor, if present, allows to measure infrared signals and/or infrared radiation on or in the environment of the roll or the wheel; if an infrared sensor is present, said information comprises this geographical positioning. Also, the positioning sensor, if present, allows to measure the geographical positioning of the roll or the wheel; if a positioning sensor is present, said information thus comprises this geographical positioning. Above-said enumeration of types of sensors is not exhaustive, as said sensor can still comprise other sensor elements of other types. Possible examples of other (whether or not partially said) types are a sound sensor, a reverberation sensor, a chemical sensor such as an acidity sensor, an optical sensor, a current intensity sensor, an electromagnetic sensor such as a current intensity sensor or a magnetic field sensor, and a gas specific sensor such as an oxygen sensor.

In a further aspect, the invention relates to a roll or wheel, preferably an industrial roll or an industrial wheel, as described above, wherein sending and receiving data comprises an encryption of said data. In other words, a kind of encryption is applied. In an embodiment, the information is encrypted just before being sent with a not further described network protocol. In another embodiment, the encryption takes place because the sending and receiving is done according to a network protocol that inherently provides for the encryption of exchanged information. In still another embodiment, the information is encrypted separately independent of the network protocol, and moreover it is exchanged by means of a network protocol that inherently provides for the encryption of information.

In a further aspect, the invention relates to a roll or wheel, preferably an industrial roll or an industrial wheel, as described above, wherein said wireless network interface of the data logger for sending and receiving is adapted for sending and receiving via a wireless protocol that is adapted for sending over a whether or not short distance, preferably Bluetooth or Wi-Fi, more preferably Near Field Communication (NFC). This form of communication is very appropriate for the present problem because the data are exchanged over a short distance, in the order of 1 centimeter to 1 meter (and still less than 25 meter). It has the advantage that the energy consumption of the wireless network interface of the data logger can remain limited, as a result of which the sent power remains limited, which in turn imposes less stringent requirements to the battery or equivalent energy source that must feed the network interface. An additional problem is that the exchange of information takes place in a small and thus well controllable environment, which strongly limits opportunities for interception, and thus promotes the information safety, in particular when it is combined with an appropriate encryption of the information.

In a further aspect, the invention relates to a roll or wheel, preferably an industrial roll or an industrial wheel, as described in the paragraph above, with a first wireless network protocol that is adapted for sending over a short distance, preferably Bluetooth or Wi-Fi, more preferably NFC, wherein said wireless network interface for sending and receiving is adapted to feed said data logger wirelessly, also if the battery or equivalent energy source that is present in the data logger is exhausted. This wireless feeding preferably takes place via a second wireless network protocol that is adapted for wireless feeding over a short distance.

It has the advantage that the information that is present in the data logger, still can be read out by an extern device, even if the data logger does not dispose of any energy anymore, and thus is not logging anymore. Hereby, the second wireless network protocol is preferably equal to the first wireless network protocol. The latter has the advantage that the energy consumption of the data logger can further be limited, as one single structure ensures both wireless sending and receiving and wireless feeding. Hereby, the second wireless network protocol does not only comprise uploading by means of an existing standardized network protocol, but also all other types of technology for power transfer, allowing to load and/or feed said battery or equivalent energy source. This is possible e.g. by means of the following technology, whether or not combined: inductive contactless loading, network protocol based loading, inductive coupling, optical feeding, resonant inductive coupling, conductive wireless loading.

In a further aspect, the invention relates to a roll or wheel, preferably an industrial roll or an industrial wheel, as described above, wherein said received data also comprise an instruction for the data logger with respect to the monitoring and/or processing and/or storage of said information, wherein the instruction preferably comprises a setting parameter. This allows to configure the data logger with an external device.

In a further aspect, the invention relates to a roll or wheel, preferably an industrial roll or an industrial wheel, as described above, wherein said data also comprises roll or wheel related data, such as e.g. a unique serial number and/or dimensions for the identification of the roll or the wheel. This allows to identify the roll or wheel in a unique manner, which offers advantages as to traceability. This also allows the processor to calculate roll related data that are e.g. necessary for determining particular alarm values.

In a further aspect, the invention relates to a roll or wheel, preferably an industrial roll or an industrial wheel, as described above, wherein the roll core or wheel core is made of metal and/or aluminum and/or stainless steel and/or carbon fiber and/or optic fiber and/or synthetic material and/or steel.

In a further aspect, the invention relates to a roll or wheel, preferably an industrial roll or an industrial wheel, as described above, wherein the roll or the wheel is adapted to a working temperature between −40° C. and +85° C.

In a further aspect, the invention relates to a roll or wheel, preferably an industrial roll or an industrial wheel, as described above, wherein the roll or the wheel is adapted to a circumferential speed between 0 and 80 km/h in a direction tangential to the roll or the wheel, or adapted to a winding frequency and/or revolution frequency between 0 and 40 Hz. This means that the printed circuit board (PCB) onto which the components that are part of the data logger, are fixed, have to be sufficiently strong to be able to resist to the corresponding centrifugal force.

In a further aspect, the invention relates to a roll or wheel, preferably an industrial roll or an industrial wheel, as described above, wherein said battery or equivalent energy source allows a life time of at least one year.

In a further aspect, the invention relates to a display device for exchanging data with a data logger of a roll or wheel, preferably an industrial roll or an industrial wheel, as described above, wherein said display device is provided with a device processor for processing said information, a tangible non-volatile device memory for the storage of said information, a wireless network interface belonging to the device adapted for sending and receiving data with the above-mentioned network interface of the data logger, a monitor for displaying and/or a printing unit for printing said information, and program data that are stored in said device memory for driving said device processor, wherein said display device is adapted for displaying said information on said monitor and/or for printing by means of the printing unit, wherein said display device is adapted for exporting selected parts of said information to a file, wherein said data preferably also comprise an instruction for the data logger with respect to the monitoring and/or processing and/or storage of said information, wherein the instruction preferably comprises a setting parameter.

In a further aspect, the invention relates to a method for storing information with respect to the operation of a roll or wheel, preferably an industrial roll or an industrial wheel, comprising the following steps:

(i) monitoring information relating to the operation of a roll or wheel with a sensor that is part of a data logger that is present on said roll or said wheel, (ii) whether or not processing said information with a processor of the data logger and storing said information in a non-volatile way in a memory of said data logger, (iii) reading said information from the memory and whether or not atomically sending it or communicating it to internal or external elements, (iv) sending and receiving said information via a network interface of said data logger, wherein step (iii) and (iv) preferably comprise an encryption of said data, wherein said wireless network interface of the data logger in step (iii) and (iv) is preferably adapted for sending and receiving via a wireless network protocol adapted for sending over a short distance, preferably Bluetooth and Wi-Fi, more preferably NFC, and preferably adapted for feeding said data logger wirelessly, preferably via a second wireless network protocol adapted for feeding wirelessly over a short distance, preferably Bluetooth or Wi-Fi, more preferably NFC, wherein the first and second wireless network protocol are preferably equal, wherein steps (i)-(iv) are preferably carried out in accordance to an instruction that is received via said network interface, wherein the instruction preferably comprises a setting parameter such as e.g. the diameter, and wherein said data preferably also comprise roll and wheel related data, such as e.g. a unique serial number and/or dimensions for identification of the roll or the wheel.

Hereby, the second wireless network protocol does not only comprise an existing standardized network protocol appropriate for loading, but also all other types of technology for power transfer, allowing to load and/or feed said battery or equivalent energy source. This is possible e.g. by means of the following technology, whether or not combined: inductive contactless loading, network protocol based loading, inductive coupling, optical feeding, resonant inductive coupling, conductive wireless loading.

In a further aspect, the invention relates to a method for displaying data and exchanging data with a data logger of a roll or wheel according the method described in steps (i)-(iv), comprising the following steps:

(A) exchanging data comprising information about the operation of said roll or said wheel between a network protocol belonging to a display device and the (iv) network interface of the data logger of said roll or said wheel mentioned, (B) displaying said information on a monitor and/or printing by means of a printing unit, belonging to said display device, (C) exporting selected parts of said information to a file, wherein step (A) preferably comprise an encryption of said data, wherein said wireless network interface of the data logger in step (A) is preferably adapted for sending and receiving via a wireless network protocol adapted for sending over a short distance, preferably Bluetooth and Wi-Fi, more preferably NFC, and preferably adapted for feeding said data logger wirelessly, preferably via a second wireless network protocol adapted for feeding wirelessly over a short distance, preferably Bluetooth or Wi-Fi, more preferably NFC, wherein the first and second wireless network protocol are preferably equal, wherein the exchange in step (A) preferably comprises sending an instruction to a roll, wherein the instruction preferably comprises a setting parameter, and wherein said data preferably also comprise roll and wheel related data, such as e.g. a unique serial number and/or dimensions for identification of the roll or the wheel.

Here too, the second wireless network protocol does not only comprise an existing standardized network protocol appropriate for loading, but also all other types of technology for power transfer, allowing to load and/or feed said battery or equivalent energy source. This is possible e.g. by means of the following technology, whether or not combined: inductive contactless loading, network protocol based loading, inductive coupling, optical feeding, resonant inductive coupling, conductive wireless loading.

In a further aspect, the invention relates to a data logger to be applied to a roll core or wheel core of a roll or wheel, preferably an industrial roll or an industrial wheel, provided with (I) a sensor for monitoring information related to the operation of said roll or said wheel, (II) a processor for processing said information, (III) tangible non-volatile memory for storing said information, (IV) a wireless network interface for sending and receiving data comprising said information, (V) program data stored in said memory for driving said processor, (VI) preferably, an indicator for displaying a part of said information, preferably a LED indicator or an audio source, (VII) a battery or equivalent energy source for feeding (I) and/or (II) and/or (III) and/or (IV) and/or (VI), wherein (I) said sensor preferably comprises an accelerometer and/or pressure sensor and/or temperature sensor and/or movement sensor and/or infrared sensor and/or positioning sensor, wherein said information preferably comprises the rotation speed and/or the pressure and/or the temperature and/or the geographical positioning of the roll or the wheel, wherein said sending and receiving of information preferably an encryption of said data, wherein said wireless network interface of the data logger for sending and receiving is adapted for sending and receiving via a wireless network protocol adapted for sending over a short distance, preferably Bluetooth or Wi-Fi, more preferably NFC, and preferably adapted for feeding said data logger wirelessly, preferably via a second wireless network protocol adapted for feeding wirelessly over a short distance, preferably Bluetooth or Wi-Fi, more preferably NFC, wherein the first and the second wireless network protocol are preferably equal, wherein said received data also comprise instructions for the data logger relating to the monitoring and/or processing and/or storage of said information, wherein the instruction preferably comprises a setting parameter, wherein said information with respect to the operation of the roll or the wheel also comprises information about the roll or the wheel in itself, such as e.g. a unique serial number and/or dimensions for identification of the roll or the wheel, wherein the data logger is adapted to an operation temperature between −40° C. and +85° C., wherein the data logger is adapted to a circumferential speed between 0 and 80 km/h in a direction tangential with respect to the roll or the wheel, adapted to a broad range of winding frequencies and/or revolution frequencies, preferably between 0 and 40 Hz, and wherein said battery or equivalent energy source allows a life time of at least one year.

Here too, the second wireless network protocol does not only comprise an existing standardized network protocol appropriate for loading, but also all other types of technology for power transfer, allowing to load and/or feed said battery or equivalent energy source. This is possible e.g. by means of the following technology, whether or not combined: inductive contactless loading, network protocol based loading, inductive coupling, optical feeding, resonant inductive coupling, conductive wireless loading.

In an embodiment of the present invention, the roll element, provided with a stiff cylindrical hollow or filled role core, is at least at one of its ends, provided with bearing axis taps, enclosed by a roll surface, in a more or less equal thickness radial to the outer surface of the roll core, wherein the ratio of the diameter of the roll core to the length of the roll core is between 0.02 and 0.50, more preferably between 0.04 and 0.2, most preferably between 0.05 and 0.15. There are also rolls, for which the diameter is larger than the length such as is mostly the case for wheels. The roll or wheel surface can further be characterized by a non-homogeneous thickness profile over a longitudinal section. This is e.g. the case for bulged rolls, bombed rolls or profiled rolls.

At said ratio of the diameter of the roll core to the length of the roll core, a self-sustained roll core is possible at one end.

In a further embodiment of the present invention, the roll element is a wheel, provided with a stiff, whether or not cylindrical hollow or filled wheel core, mostly not provided with axis taps, but provided with internal bearings or bearing fittings, and enclosed by a roll element surface, in this case a wheel surface.

In the present invention, the terms "treating", "processing" and "transporting" of goods mean an advanced automated industrial process.

According to an embodiment of the present invention, the roll element is a roll with bearing seats, onto which bearings can be mounted in a tight way. These bearings are e.g. each situated in a bearing case, wherein a part of the bearing case is positioned in a fixed way onto the machine frame and the other part of the bearing case is positioned in an easily mountable and demountable way, to allow an easy assembly and disassembly.

An important advantage of the present invention is the improved problem solving after a defect of a roll or wheel. We hereby consider e.g. the case of a roll that is part of an industrial installation. After determining a defect, a defective roll is removed from the industrial installation of which it is part. Subsequently, it is subjected to further inspection to find the cause of the defect. In many cases, it is however not the operator of the installation who carries out this inspection, but another party, e.g. the producer of the roll. In such cases, according to the state of the art, there is typically very little information available to carry out the inspection, and the producer carrying out the inspection is mostly limited to a simple visual inspection of the roll surface. The most important factors leading to a defect, such as the rotation speed to which the roll is subjected in use, is indeed typically not known to the producer. These factors, and possible dimensions thereof, can be well-known to the operator of the installation, but that doesn't mean this information is passed onto the producer. In order to pass on this information, in a solution according to the state of the, an extensive logic chain must indeed be set up. Firstly, the operator of the installation must provide for a device to log information about the operation of the roll. Hereby, the device must moreover dispose of the necessary software to allow to distinguish the information to transfer about the operation of one specific roll from all other information. The latter is not only useful to avoid that irrelevant data ends up between the information to transfer, but it is moreover also necessary if one wants to avoid that possible confidential information is spread unintentionally. Once the information about the specific roll is distinguished from the other information, this information must moreover be transferred to the producer of the roll, which typically entails quite some manual tasks. The described situation clearly shows that a solution according to the state of art is quite complex, and will therefore not or rarely be used in practice. The present invention however offers a solution that can be easily applied in practice, by passing on in an easy and secure way information about the operation of the roll onto the producer of the roll, without the operator of the installation having to do any operation. When a defective roll is sent to the producer for inspection, the producer only has to read out the information that is present in the data logger of the roll in order to get immediately a detailed view of the operation of the roll. This allows the producer to come to a sound problem solving when considering the possible causes of the defect. This is e.g. important to find possible defects to the design of the roll and to be able to take preventive actions, but also e.g. to give possible advice to the operator of the installation while the roll is still operative. The data can indeed also be read out while the roll is still operative (during a standstill or even during operation). Thanks to the information about the operation of the roll, the producer indeed gets a better view of the final use of the roll, and can, based on this use, suggest exactly the type of roll to the operator of the installation that is most appropriate for the described use. The same considerations apply to the case of a wheel.

An additional advantage of the present invention is the possibility of preventive maintenance. Thus, in case of a planned preventive maintenance, the operator can make a connection with the data logger of the roll or wheel while it is operative, and thereby does not have to stop working. Based on the stored data, he or she can subsequently decide whether or the not the roll or the wheel must be put out of operation to be maintained, or on the contrary, can remain operative and if whether or not a maintenance or repair session must be planned. In this way, superfluous maintenance can be avoided as much as possible, and one can also act in a preventive way. By working in a preventive way, the risk of a critical defect to the roll or the wheel is reduced, as well as the risk of a standstill of the possible industrial installation or the possible means of transport of which the roll or the wheel is part.

According to an embodiment of the present invention, a processor that is present in the data logger provides for the processing of information, wherein the processor is controlled by program data that are stored in the memory. In this way, the measured information is not only stored in the memory, but also operations can be carried out onto it. An example thereof is that the processor counts the number of pulses per minute and calculates statistics thereof such as for example the average.

According to an embodiment of the present invention, two or more components are present in the data logger, such as e.g. the accelerometer and the processor, that are mutually connected to one Serial Peripheral Interface (SPI) bus.

According to an embodiment of the present invention, the data received by the roll or by the wheel, preferably the data received by the industrial roll or by the industrial wheel also comprise an instruction for the data logger with respect to the monitoring and/or processing and/or storage of said information, wherein the instruction preferably comprises a setting parameter. This allows to configure the data logger with an extern device. An example thereof is that setting of a speed limit, wherein the data logger registers timestamps each time the speed exceeds the defined limit. Another example thereof, applicable to an embodiment of the present invention wherein an accelerometer is provided as part of the data logger, is the configuration of the accelerometer so that each rotation of the roll or the wheel results in a pulse at the output of the accelerometer. Dependent on the specific embodiment, this can offer advantages, such as e.g. the reduction of the amount of communication on above-said SPI bus, if such bus is present.

In a further embodiment, the sensor that is part of the data logger, is adapted to carry out high frequency measurements. This offers on the one hand the additional advantage that the above-said information can be monitored with a small delay, and on the other hand that extra information can also be gathered. Thus, e.g. sudden impacts or stops can be detected faster and better. Also, undesired vibrations of the bearings, e.g. as a result of wear, can be detected faster and better, which would be possible or even impossible when monitoring at low frequency.

In a preferred embodiment, the data logger is installed on the roll core or wheel core of the roll or the wheel in such way that a balanced weight repartition is obtained for the roll or the wheel as a whole, inclusive of the data logger. This is important to avoid that different forces that act onto the data logger and the roll or the wheel as a whole cause undesired effects during operation. Examples of undesired effects are the interruption of the operation of the data logger or the bringing out of balance of the roll or the wheel as a whole. A similar balanced weight repartition is reached by the present invention in the following ways, separately or in combination.

A first way of realizing a balanced weight repartition is by having the data logger carry out torus formation and having attach it at one or both side planes of the roll or the wheel, in such way that the data logger extends radially over this plane circumferential to the axis portion of the side plane without abutting this axis portion, wherein the axis portion relates to the part of the side plane that is occupied by the axis, wherein the axis is perpendicular to this side plane. Hereby, the roll or wheel core comprises the axis portion. In an exemplary embodiment, the axis portion is e.g. the part of the side plane occupied by the axis tap, e.g. in an embodiment with external bearing axis tap; in a second exemplary embodiment, the axis portion is part of the side plane occupied by the recess of the roll elements, e.g. in an embodiment with internal roll elements. This first way of realizing a balanced weight repartition has the advantage that the weight of the data logger is spread over the side plane in a more equal way than in other cases such as e.g. for a beam-shaped data logger that is attached to the side plane. Specifically, the torus form allows that the weight of a first data logger part at one lateral side of the axis is compensated radially by the weight of a second data logger part that is situated diametrically with respect to the first data logger part. This radial compensation applies to an embodiment wherein said torus form is a simple ring of a ring-shaped band, but also applies to an embodiment, wherein the torus form has a less obvious form, such as a torus essentially with the form of a frame, e.g. a torus with two concentric squares as base and upper plane connected by a plurality of side plane orthogonal to both the base and the upper plane.

A second way of realizing balanced weight repartition is complementary to the first way, but can also be supplementary to it. Hereby, a compensation is provided in the axis direction of the roll or the wheel. This compensation in the axis direction or axial compensation can amongst other things be realized by attaching to the second side plane that is not provided with a data logger, an axial compensation element that in form, volume and weight is equal to the data logger that is attached to the first die plane, wherein preferably also the way of attachment of the axial compensation element is essentially equal to the way of attachment of the data logger. The axial compensation element functions hereby as a counter-weight. In another embodiment, the counter-weight is attached is also mounted in the same plane of the data logger. The advantage of such a device and method is that an axial compensation is provided, so that the presence of the data logger has as little impact as possible to the final operation of the roll or the wheel. In a preferred embodiment, the second way is combined with the first way so that both radial and axial compensation is provided, and said impact is further reduced. In an embodiment, the axial compensation element is not a passive element, but a second data logger, that can have identical functionality to the first data logger, or non-identical. In case of identical functionality, it has amongst other things the advantage that one can measure in a precise way and that the reliability increases as the measurements are also carried out when one of the data loggers fails. In case of non-identical functionality, it has the advantage that the different parameters to monitor are monitored in a complementary way, which amongst other things increases the degrees of freedom in the technical design and the maintenance, and thus allows a more efficient design and maintenance.

A third way of realizing balanced weight repartition contrasts with the first way, because of the requirement of avoiding radial compensation. This way is appropriate for an embodiment wherein the roll or the wheel disposes of a bearing axis tap at least at one end, wherein the first bearing axis tap is preferably free-running and kept in place in a bearing case and this preferably without the presence of a drive, while the second bearing axis tap, if present, is whether or not adapted to be driven if a drive is present. The bearing case of the first bearing axis tap is hereby adapted to receive the first bearing axis tap, and comprises moreover sufficient space to receive in a contactless way the data logger that is attached to the free end of the first bearing axis tap. Hereby, the data logger is preferably compact, and preferably has an axially symmetric form with a revolution symmetry with respect to a data logger axis. This axial symmetry allows the realize the attachment of the data logger at the end of the first bearing axis tap so that the data logger axis and the longitudinal axis of the roll or wheel coincide. In this latter case, the data logger is attached coaxially to the roll or wheel. Attachment at the end of the bearing axis tap has the advantage that only minimal centripetal and/or centrifugal and/or other forces act interfere with the data logger, with consequently only very limited impact to the operation of the roll or the wheel, and little mechanical load on the data logger. This increases as the data logger is designed in a more compact way, and pre-eminently if the data logger is attached axially symmetrically and coaxially.

A fourth way of realizing balanced weight repartition is analogue to the second way, wherein there is axial compensation in the axis direction of the roll or the wheel as in the second way, also if the data logger at the end of a first bearing axis tap is attached to the first end of the roll or the wheel, in accordance to the third way. The compensation in the axis direction or axial compensation is hereby realized optimally if the second end of the roll or the wheel comprises a second bearing axis tap that is preferably free-running and allows to attach an axial compensation element to its end. As in the second way, it relates to an axial compensation element that in form, volume and weight is essentially equal to the data logger that is attached to the first bearing axis tap, wherein preferably also the way of attachment of the axial compensation element is essentially equal to the way of attachment of the data logger. The axial compensation element functions hereby as a counter-weight. As in the second way of realizing a balanced weight repartition, the advantage of such a device and method is that it realizes axial compensation, so that the presence of the data logger only has a very little impact on the final operation of the roll or the wheel. Analogue to the second way, the axial compensation element in an embodiment is not a passive element, but a second data logger, that can have identical functionality to the first data logger, or non-identical functionality. In case of identical functionality, it has amongst other things the advantage that one can measure in a precise way and that the reliability increases as the measurements are also carried out when one of the data loggers fails. In case of non-identical functionality, it has the advantage that the different parameters to monitor are monitored in a complementary way, which increases the degrees of freedom in the technical design and the maintenance, and thus allows a more efficient design and maintenance.

A fifth way of realizing a balanced weight repartition is analogue to the first way, wherein instead of making use of a torus-shaped data logger, a non-torus-shaped data logger is used such as e.g. a beam-shaped data logger, but there is still radial compensation. This is possible by attaching a radial compensation element on the same side plane as the data logger and this diametrically with respect to the data logger. Hereby, the radial compensation element is in form, volume and weight essentially equal to the data logger that is attached to the same first side plane, and preferably, also the way of attachment of the radial compensation element is essentially equal to the way of attachment of the data logger. The radial compensation element functions hereby as a counter-weight. Here too, such a device and method has the advantage that radial compensation is provided, so that the presence of the data logger has as little impact as possible to the final operation of the roll or the wheel. Furthermore, here too, there is the possibility that the radial compensation element is no passive element, but an additional data logger with identical or non-identical functionality, with similar advantages as these mentioned above for an axial compensation element embodied as an additional data logger.

A sixth way of realizing a balanced weight repartition is analogue to the fourth and in particular the second way, wherein there is axial compensation in the axis direction of the roll or the wheel so that in the second way, also if on the first side plane of the roll or the wheel, not only a data logger, but also a radial compensation element is attached, in accordance to the fifth way. In this case, the axial compensation is realized by attaching on the second side plane that is provided with a data logger, a combination of axial compensation elements that in form, volume, weight and number are essentially equal to the assembly of data logger and radial compensation element(s) attached to the first side plane, wherein preferably also the way of attachment of this axial compensation elements is essentially equal to the way of attachment of the assembly of data logger and radial compensation element(s). The assembly of axial compensation elements hereby functions as a counter-weight. Advantages of such a device and method are similar to those of the second and fourth way of realizing a balanced weight repartition. As in the above-mentioned ways, the assembly of axial compensation elements in an embodiment is not necessarily passive, but it can comprise one or more additional data loggers. Hereby the functionality can whether or not be identical to the first data logger and whether or not mutually identical, with as respective advantages, the above-mentioned advantages of other additional data loggers.

In a preferred embodiment, said roll relates to an industrial roll that is adapted for use in an industrial installation. In such an embodiment, the roll core is a stiff cylindrical hollow or filled roll core that is provided at its case with a roll surface that is subject to wear. This roll surface can be a separately produced roll sleeve, but it can also be a fouling onto the roll core. In an embodiment, the roll core comprises at its ends bearing-axis-taps or internal roll elements.

According to an alternative embodiment, said roll or said wheel relates to a wheel that is related to transport and/or movement. In a further preferred embodiment, the wheel is adapted to be mounted on a means of transport and/or the invention relates to a means of transport comprising a wheel according to the present invention. The means of transport can hereby comprise three, four or more wheels, such as a private car, a truck, a bus, a touring car, a van, a quad, a railway wagon, a locomotive or a tricycle. The vehicle can however also be provided with one or two wheels, such as a bicycle, a motor cycle, a motorbike, a scooter, a sidecar, a trailer or a caravan. In still another embodiment, the means of transport is a skate board, a step, a skeeler, an in-line skate or a shopping trolley.

EXAMPLES

In the following, the invention will further be illustrated by means of two examples, without however being limited thereto.

Example 1: Industrial Roll With Roll Sleeve

In this example, the roll or the wheel according to the present invention relates to an industrial roll for use in an industrial installation. The roll comprises a separately produced roll sleeve. The roll core is stiff and essentially cylindrical and is at its lateral surface provided with ventilation holes. By blowing out air at high velocity through the ventilation holes, the roll sleeve is expanded and it can easily be slit over the roll core or removed from the roll core. By means of the data logger according to the present invention, it is possible to monitor the correct operation of the roll, because the data logger monitors information with respect to the operation such as the revolution speed. Moreover, via the data logger, it is possible to identify the roll in a unique way by means of a code, both when the roll is mounted as part of the industrial installation as when the roll is in a disassembled state. In an alternative embodiment, it is not the roll that is identified in a unique way, but the roll sleeve, wherein both are identified with two codes, or the combination of both are collectively identified as one single code.

Example 2: Wheel For Private Car

In this example, the roll or the wheel according to the present invention relates to a wheel for a private care. The wheel comprises a separately produced tire made of vulcanized rubber. The wheel is meant for being mounted on an axis. The wheel core is stiff and essentially cylindrical with respect to this axis. The wheel core is at its lateral surface provided with an external circumference that is adapted in form for receiving a tire. By means of the data logger according to the present invention, it is possible to monitor the correct operation of the wheel, because the data logger monitors information with respect to the operation such as the revolution speed. Moreover, it is possible via the data logger to identify the wheel in a unique way, both when the wheel is mounted on the private car as when the wheel is in a disassembled state. In an alternative embodiment, it is not the wheel that is identified in a unique way, but only the tire, wherein both are identified with two codes, or the combination of both are collectively identified as one single code. In cases wherein the tire is identified, the invention allows e.g. to identify car tires in a warehouse for tires such as a tire center.

The invention claimed is:

1. Roll or wheel (1), wherein the roll or wheel is provided with
   (i) a stiff, substantially cylindrical core (2) that is provided at its lateral surface with a surface (3) that is subject to wear;
   (ii) a data logger (7), the data logger provided with
      (a) a sensor (8) for monitoring information with respect to the operation of said roll or wheel or said surface,
      (b) a processor (9) for processing said information,
      (c) tangible non-volatile memory (10) for storing said information,
      (d) a wireless network interface (11) for sending and receiving data comprising said information,
      (e) program data stored in said memory for driving said processor,
      (f) a battery or equivalent energy source (13) for feeding (a) and/or (b) and/or (c) and/or (d),
   wherein said data comprise roll or wheel related data
   wherein said data logger is adapted for sending said roll and wheel related data and said monitored information,
   wherein the roll or wheel is an industrial roller,
   wherein said sensor comprises an accelerometer (8) wherein said information comprises rotation speed and/or number of revolutions,
   and wherein said roll or wheel is provided at an end with an axle, wherein said data logger is positioned on said axle, at the end of said axle.

2. Roll or wheel according to claim 1, wherein the roll or wheel is adapted for functioning without a drive.

3. Roll or wheel according to claim 1, wherein the roll or wheel is adapted for functioning with a drive.

4. Roll or wheel according to claim 1, wherein said data logger is completely countersunk on said core or said surface.

5. Roll or wheel according to claim 1, wherein said data logger is completely countersunk on said axle.

6. Roll or wheel according claim 1, wherein said sensor comprises a pressure sensor, wherein said information comprises pressure, a temperature sensor, wherein said information comprises temperature, a movement sensor, wherein said information comprises movement, an infrared sensor, wherein said information comprises infrared signal and/or infrared radiation, a sensor for carrying out high frequency measurements for detecting vibrations, or a positioning sensor, wherein said information comprises the geographical positioning of the roll or wheel.

7. Roll or wheel according to claim 1, wherein said sending and receiving of information comprises an encryption of said data.

8. Roll or wheel according to claim 1, wherein said wireless network interface of the data logger for sending and receiving is adapted for sending and receiving via a wireless network protocol that is adapted for sending over a short distance, Bluetooth, Wi-Fi or NFC.

9. Roll or wheel according to claim 8, wherein said wireless network interface for sending and receiving via a first wireless network protocol is adapted for feeding said data logger wirelessly, if said battery or equivalent energy source is exhausted, via a second wireless network protocol adapted for feeding wirelessly over a short distance, that is equal to the first wireless network protocol.

10. Roll or wheel according to claim 1, wherein said data also comprise an instruction for the data logger with respect to the monitoring and/or processing and/or storage of said information, wherein the instruction comprises a setting parameter.

11. Roll or wheel according to claim 1, wherein the roll core or wheel core is made of metal, aluminum, stainless steel, carbon fiber, optic fiber, synthetic material or steel.

12. Roll or wheel according claim 1, wherein the roll or wheel is adapted to an operation temperature between −40° C. to +85C°.

13. Roll or wheel according to claim 1, wherein the roll or wheel is adapted to a circumferential speed between 0 and 80 km/h in a direction tangential to the roll or wheel, or adapted to a winding frequency and/or revolution frequency between 0 and 40 Hz.

14. Roll or wheel according to claim 1, wherein said battery or equivalent energy source allows a life time of at least one year.

15. Display device (5) for exchanging data with a data logger of a roll or wheel of claim 1, wherein said display device is provided with a device processor (15) for processing said information, tangible non-volatile device memory (16) for the storage of said information, a wireless network interface (17) belonging to the device adapted for sending and receiving data with said network interface of the data logger mentioned in (d), a monitor (14), or a printing unit for displaying and/or printing said information, and program data that are stored in said device memory for driving said device processor, wherein said display device is adapted for displaying said information on said monitor and/or for printing by means of said printing unit, wherein said display device is adapted for exporting selected parts of said information to a file, wherein said data also comprise an instruction for the data logger with respect to the monitoring, processing or storage of said information, wherein the instruction comprises a setting parameter.

16. A roll or wheel according to claim 1 in an industrial installation.

17. Roll or wheel according to claim 1, wherein the indicator comprises a LED indicator or an audio source.

18. Roll or wheel according to claim 1, wherein the roll or wheel related data comprises a unique serial number, dimensions or location for identification of the roll or the wheel.

19. Roll or wheel according to claim 1, wherein said data roller is compact, and has an axially symmetric form with a revolution symmetry with respect to a data logger axis, and wherein said roll or wheel disposes of a bearing axis tap at least at one end, and wherein the data logger is attached at the end of said bearing axis tap at said at least one end so that the data logger axis and the longitudinal axis of the roll or wheel coincide.

20. Data logger adapted for being positioned onto a roll or wheel, the data logger being provided with:
    (I) a sensor for monitoring information related to the operation of said roll or said wheel,
    (II) a processor for processing said information,
    (Ill) tangible non-volatile memory for storage of said information,
    (IV) a wireless network interface for sending and receiving data comprising said information,
    (V) program data stored in said memory for driving said processor,
    (VI) a battery or equivalent energy source for feeding (I) and/or (II) and/or (III) and/or (IV),
wherein the sensor mentioned in (I) comprises an accelerometer (8), wherein said information comprises rotation speed and/or pressure sensor, wherein said information comprises pressure and/or temperature sensor, wherein said information comprises temperature and/or movement sensor, wherein said information comprises movement and/or infrared sensor, wherein said information comprises infrared signal and/or infrared radiation and/or positioning sensor, wherein said information comprises the geographical positioning of the roll or wheel,
wherein said sending and receiving of information comprises an encryption of said data, wherein said wireless network interface of the data logger for sending and receiving is for sending and receiving via a wireless network protocol adapted for sending over a short distance, Bluetooth, Wi-Fi or NFC, and is adapted for feeding said data logger wirelessly, via a second wireless network protocol that is adapted for feeding wirelessly over a short distance, Bluetooth, Wi-Fi or NFC, wherein the first and the second wireless network protocol are equal, wherein said received data also comprise an instruction for the data logger with respect to the monitoring and/or processing and/or storage of said information, wherein the instruction comprises a setting parameter,
wherein said information relating to the operation of the roll or the wheel also comprises information relating to the roll or the wheel in itself, a unique serial number and/or dimensions for identification of the roll or the wheel,
wherein the data logger is adapted at an operation temperature between −40° C. to +85° C.,
wherein the data logger is adapted to a circumferential speed between 0 and 80 km/h in a direction tangential to the roll or the wheel and a winding frequency or revolution frequency between 0 and 40 Hz,
wherein said battery or equivalent energy source allows a life time of at least one year, wherein the roll or wheel is an industrial roller,
wherein said data logger is adapted to be positioned on an axis of said roll or wheel; and wherein said data logger is positioned on said axle, at the end of said axle.

* * * * *